United States Patent
Martinez et al.

[11] Patent Number: 6,137,468
[45] Date of Patent: Oct. 24, 2000

[54] METHOD AND APPARATUS FOR ALTERING A DISPLAY IN RESPONSE TO CHANGES IN ATTITUDE RELATIVE TO A PLANE

[75] Inventors: Anthony Edward Martinez; Sarka Martinez, both of Austin, Tex.

[73] Assignee: International Business Machines Corporation, Armonk, N.Y.

[21] Appl. No.: 08/730,593

[22] Filed: Oct. 15, 1996

[51] Int. Cl.[7] .................................................. G09G 5/34
[52] U.S. Cl. ........................................ 345/126; 345/121
[58] Field of Search ................................... 345/121, 158, 345/126, 352, 348, 115, 905, 681, 145, 51

[56] References Cited

U.S. PATENT DOCUMENTS

| | | | |
|---|---|---|---|
| 4,267,555 | 5/1981 | Boyd et al. | 345/126 |
| 4,542,377 | 9/1985 | Hagen et al. | 345/126 |
| 5,134,390 | 7/1992 | Kishimoto et al. | 345/126 |
| 5,181,181 | 1/1993 | Glynn | 364/566 |
| 5,189,404 | 2/1993 | Masimo et al. | 345/121 |
| 5,329,289 | 7/1994 | Sakamoto et al. | 345/126 |
| 5,661,632 | 8/1997 | Register | 345/905 |
| 5,708,561 | 1/1998 | Huilogol et al. | 361/681 |
| 5,732,228 | 3/1998 | Jaaskelainen | 345/145 |
| 5,742,331 | 4/1998 | Uomori et al. | 345/51 |
| 5,774,233 | 6/1998 | Sakamoto | 345/126 |
| 5,784,045 | 7/1998 | Chine et al. | 345/121 |
| 5,798,750 | 8/1998 | Ozaki | 345/126 |

OTHER PUBLICATIONS

Cowart, Robert, Mastering Windows 3.1 Special Edition; SYBEX; pp. 66–67, 1993.

"Force–Accommodating Moves in Manipulators", IBM Technical Dislcosure Bulletin, vol. 20 No. 5, Oct. 1977.

"Method for Enabling and Controlling Computer Input from Plurality of Pointing Devices", IBM Technical Disclosure Bulletin, vol. No. 03, Mar. 1995.

*Primary Examiner*—Steven J. Saras
*Assistant Examiner*—Alecia D. Nelson
*Attorney, Agent, or Firm*—Leslie A. Van Leeuwen; Felsman, Bradley, Vaden, Gunter & Dillon, LLP

[57] ABSTRACT

The present invention provides a method and apparatus for altering the display of an object on a display device in a data processing system. Changes in the attitude of a device within the data processing system are detected relative to a reference plane. The device may be a display device or some other device within the data processing system. The display of the object is altered in response to detecting selected changes in the attitude of the device.

15 Claims, 10 Drawing Sheets

SENSOR READOUT x = 0
y = 0

METHOD AND APPARATUS FOR ALTERING A DISPLAY IN RESPONSE TO CHANGES IN ATTITUDE RELATIVE TO A PLANE

BACKGROUND OF THE INVENTION

1. Technical Field

The present invention relates generally to an improved data processing system and in particular to an improved display within a data processing system. Still more particularly, the present invention relates to an improved method and apparatus for altering a display within a data processing system in response to a change in orientation in hardware associated with the data processing system.

2. Description of the Related Art

The manipulation of data in a data processing system is well known in the prior art. Data may be manipulated in many ways in a modern state-of-the-art data processing system including data accessing, data encoding, data communications, data compression, data conversion, data exchange, data linking, data locking, data mapping, data modeling, data sorting, data recording, and data transferring. The large amounts of data that are available to the user of a modern state-of-the-art data processing system often becomes overwhelming in magnitude and complexity.

As a result of the increase in complexity of data processing systems, attempts have been made to simplify the interface between a user and the large amounts of data present within a modern data processing system. One example of an attempt to simplify the interface between a user and a data processing system is the utilization of a graphic user interface (GUI) to provide an intuitive in graphical interphase between the user and the data processing system. A GUI is an interface system, including devices, by which a user interacts with a data processing system, system components, and/or system applications via windows or via ports, icons, menus, pointing devices, etc. Another advancement in the computer art allows a user to simultaneously access, display, and manipulate data from a variety of related and/or unrelated computer application programs. This process is generally referred to as "multi-tasking". In a true multi-tasking system, several application programs are simultaneously active. Displays from each of these applications may be provided within a two dimensional display by presenting overlapping data collections and multiple layers in a simulated three-dimensional manner within the display of a data processing system. Each of these layers presents data associated with a particular data collection and these layers typically overlap and may partially or completely obscure each other and other data therein.

Other advances in data processing systems include changing the presentation of data in response to changes in hardware. For example, display systems are presently available in which the monitor can be pivoted to either a landscape or a portrait mode. Additionally, the video driver associated with the display detects the change in display modes and switches a software to provide for the change. Such a system is restricted to detecting changes in one access, in one direction, for a 90° arc from 0° to 90°. Additionally, as pivoting occurs, the monitor goes blank until the end of the arc is reached. No intermediate positions or sampling is provided by such a system. Therefore, it would be advantageous to have a method and apparatus to detect various changes in orientation of hardware associated with a data processing system in which the display is altered in response to various changes in orientation of the hardware.

SUMMARY OF THE INVENTION

It is therefore on object of the present invention to provide an improved data processing system.

It is another object of the present invention to provide an improved display within a data processing system.

It is yet another object of the present invention to provide an improved method and apparatus for altering a display within a data processing system in response to a change in orientation and hardware associated with the data processing system.

The present invention provides a method and apparatus for altering the display of an object on a display device in a data processing system. Changes in the attitude of a device within the data processing system are detected relative to a reference plane. The device may be a display device or some other device within the data processing system. The display of the object is altered in response to detecting selected changes in the attitude of the device.

The display may be altered by maintaining the object level relative to the reference plane although the display device or some other device incurs changes in attitude. Alternatively, various objects, such as windows or icons displayed on the display device may be arranged or altered in response to the changes in attitude.

The above as well as additional objects, features, and advantages of the present invention will become apparent with the following detailed description.

DETAILED DESCRIPTION OF THE PREFERRED EMBODIMENT

Figure 1A:
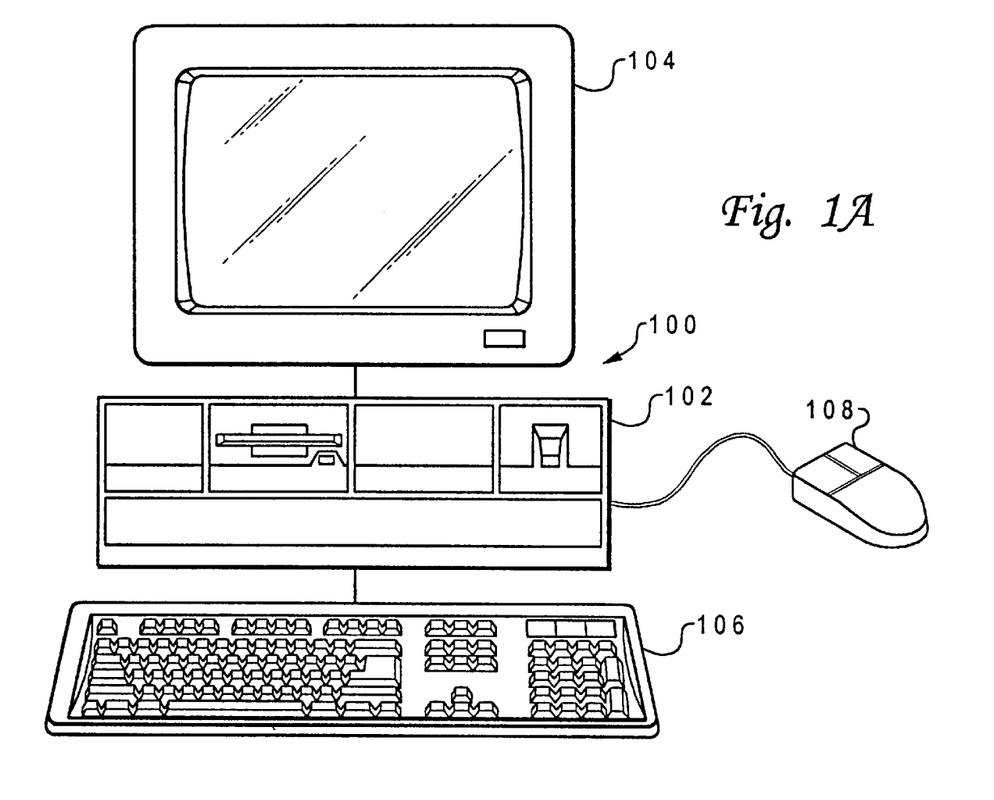
FIG. 1A is a pictorial representation of a computer system depicted in which the present invention may be implemented in accordance with a preferred embodiment of the present invention.

With reference now to the figures and in particular with reference to FIG. 1A, a pictorial representation of a computer system is depicted in which a preferred embodiment of the present invention may be implemented in accordance with a preferred embodiment of the present invention. A personal computer 100 is depicted which includes a system unit 102, a video display terminal 104, a keyboard 106, and a mouse 108. Personal computer 100 may be implemented utilizing any suitable computer such as an IBM PS/2 computer, a product of International Business Machines Corporation. "PS/2" is a registered trademark of International Business Machines Corporation. Although the depicted embodiment involves a personal computer, a preferred embodiment of the present invention may be implemented in other types of data processing systems, such as for example, intelligent work stations or mini-computers. A sensor for detecting changes in position may be located within the data processing system or externalized with a peripheral device associated with the data processing system, such as a mouse or some other pointing device. Computer 100 may be implemented utilizing any suitable computer, such as an IBM PS/2 computer, a product of International Business Machines Corporation.

Figure 1B:
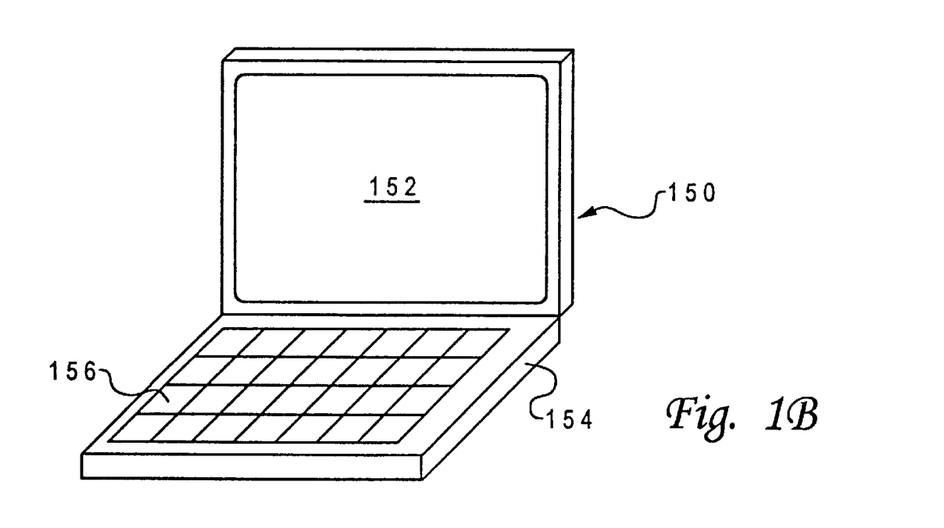
FIG. 1B is an illustration of a laptop computer in which the present invention may be implemented.

In FIG. 1B, a laptop computer 150 is depicted in which the present invention may be implemented. Laptop computer 150 includes a display 152 and a system unit 154 containing a keyboard 156. Laptop computer 150 may be implemented using any suitable computer, such as an IBM ThinkPad. "ThinkPad" is a trademark of International Business Machines Corporation.

Figure 2:
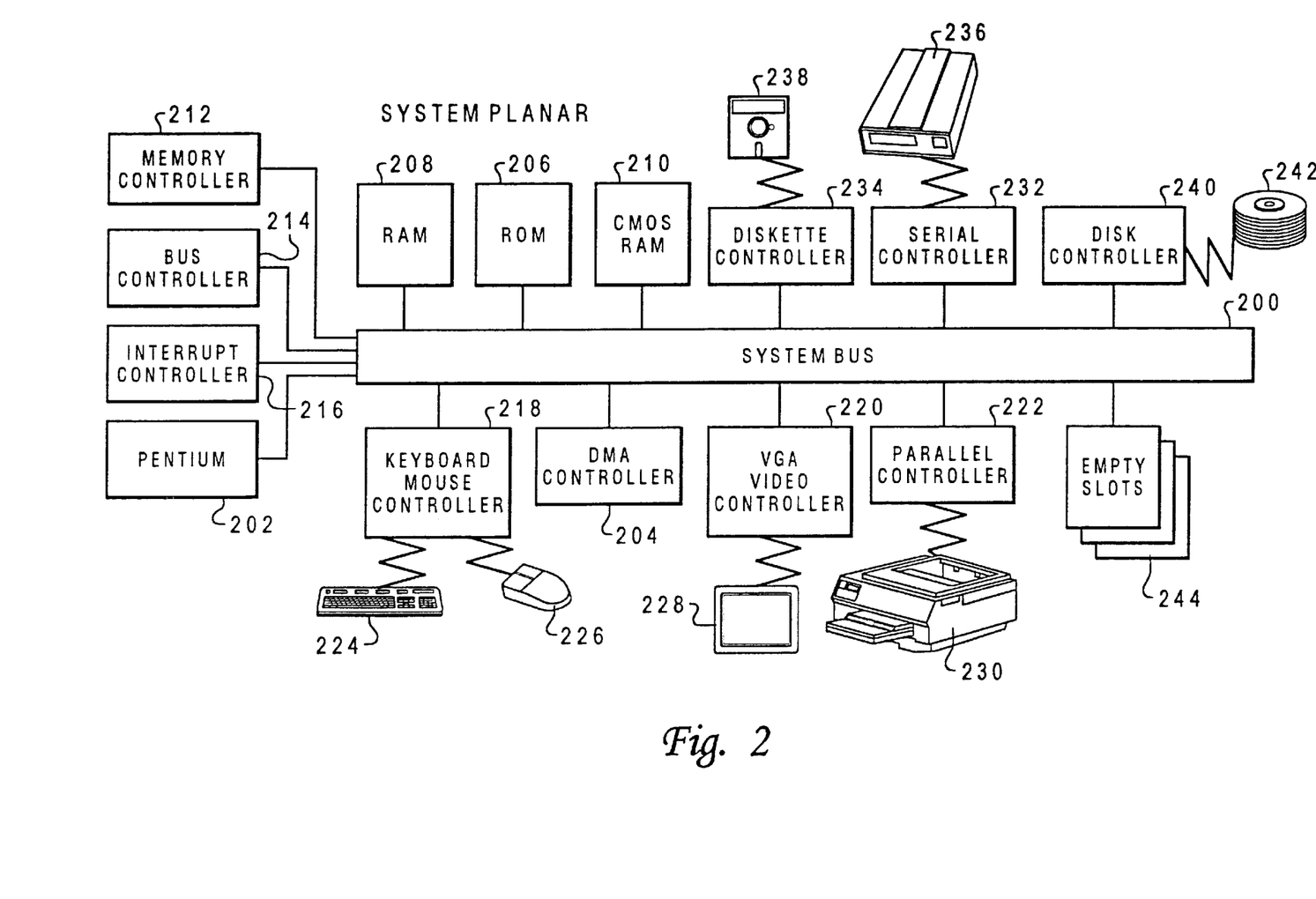
FIG. 2 depicts a block diagram of selected components in personal computer 100 or laptop computer in which a preferred embodiment of the present invention may be implemented.

With reference now to FIG. 2, a block diagram of selected components in personal computer 100 or laptop computer 150 is depicted in which a preferred embodiment of the present invention may be implemented. System unit 102 or 154 preferably includes a system bus 200 for interconnecting and establishing communication between various components in system unit 102 or 154. Microprocessor 202 is connected to system bus 200. Direct Memory Access controller 204 is also connected to system bus 200 and allows various devices to appropriate cycles from microprocessor 202 during large I/O transfers.

Read only memory ("ROM") 206 is mapped into the microprocessor 202 address space in the range from 640K to 1 megabyte. Read Only Memory ("ROM") 206 and Random Access Memory ("RAM") 208 are also connected to system bus 200. ROM 206 contains the power-on self test ("POST") and the Basic Input/Output System ("BIOS"), which control hardware operations, such as those involving disk drives and the keyboard. Complementary Metal-Oxide-Semiconductor Random Access Memory (CMOS RAM) 210 is attached to system bus 200 and contains system configuration information.

Also connected to system bus 200 are memory controller 212, bus controller 214, and interrupt controller 216, which serve to aid in the control of data flow through system bus 200 between various peripherals, adapters, and devices. System unit 102 or 154 also contains various input/output ("I/O") controllers such as: keyboard and mouse controller 218, video controller 220, parallel controller 222, serial controller 232, and diskette controller 238. Keyboard and mouse controller 218 provide a hardware interface for keyboard 224 and mouse 226. Video controller 220 provides a hardware interface for video display device 228. Parallel controller 222 provides a hardware interface for devices such as printer 230. Serial controller 232 provides a hardware interface for devices such as a modem 236. Diskette controller 234 provides a hardware interface for floppy disk unit 238. Expansion cards may also be added to system bus 200, such as disk controller 240, which provides a hardware interface for hard disk unit 242. Empty slots 224 for receiving adapter cards or PC cards are provided so that other peripherals, adapters, and devices may be added.

Those skilled in the art will appreciate that the hardware depicted in FIG. 2 may vary for specific applications. For example, other peripheral devices such as optical disk media, audio adapters, or chip programming devices such as a Programmable Logic Array (PLA) or Erasable, Electrically-Programmable Read Only Memory (EEPROM) programming device, and the like also may be utilized in addition to or in place of the hardware already depicted.

Figure 3:
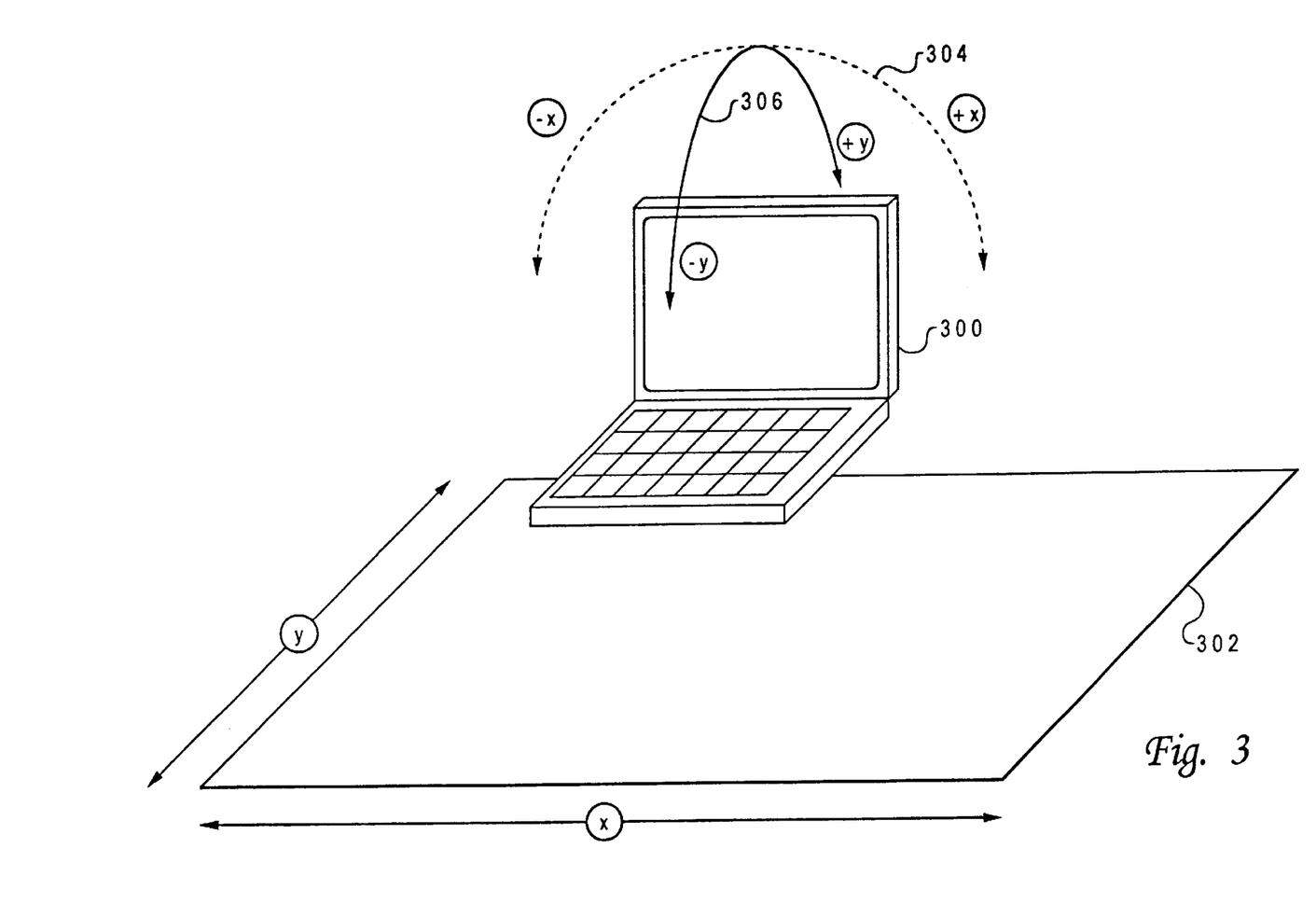
FIG. 3 is an illustration of orientations of a laptop computer according to the present invention.

Turning now to FIG. 3, an illustration of different orientations of a laptop computer is depicted according to the present invention. Orientation of laptop computer 300 is determined relative to plane 302 having an X axis and a Y axis. Rotating laptop 300 around the Y axis along arrow 304 results in a change in orientation in the X value while rotating laptop 300 around the X axis along arrow 306 results in a change in orientation also referred to as "attitude" along the Y value. Changes in "attitude" are rotations relative to a fixed plane (i.e. plane 302).

Figure 4A:
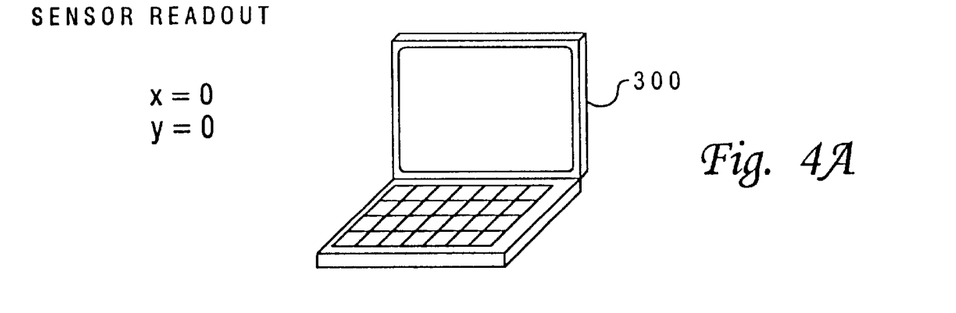
FIGS. 4A–4D depicts data obtained from a sensor in response to different attitudes of laptop 300 according to the present invention.
Figure 4B:
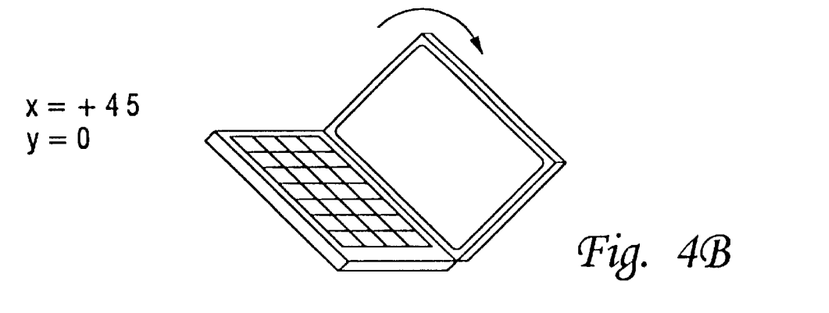
Figure 4C:
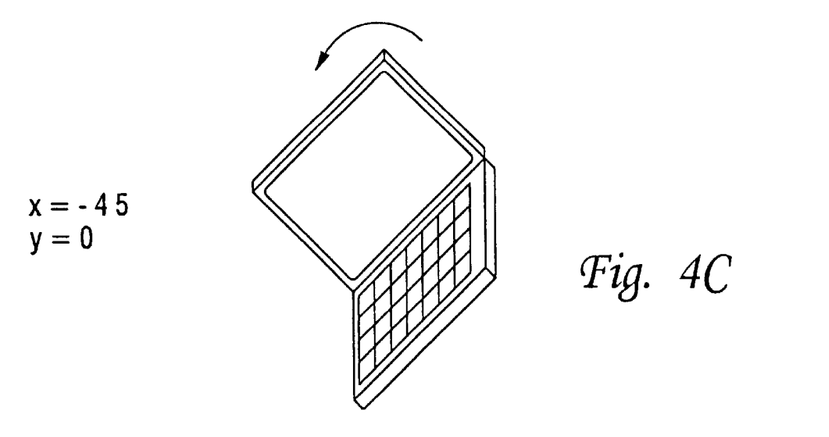
Figure 4D:
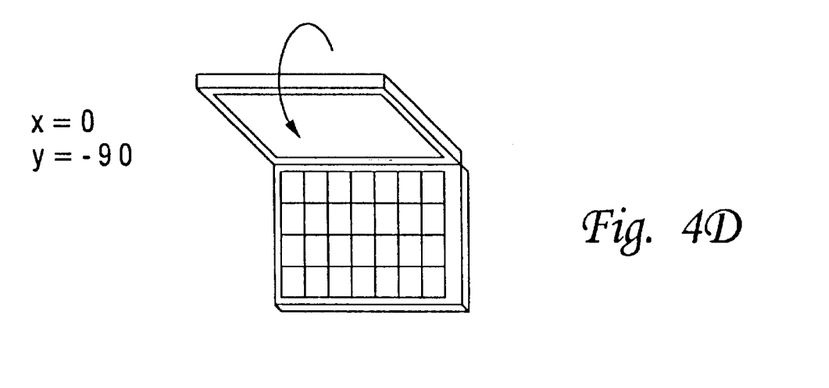

Turning to FIGS. 4A–4D, the data obtained from a sensor in response to different attitudes of laptop 300 is depicted according to the present invention. In FIG. 4A, the attitude of laptop 300 relative to a reference plane provides a sensor readout of X=0° and Y=0°. In FIG. 4B, laptop 300 is rotated around the Y axis resulting in a X value equal to +45° and a Y value equal to 0°. The X value equals −45° while Y=0° when laptop 300 is rotated in the opposite direction from that shown in FIG. 4B. In FIG. 4D, the rotation of laptop 300 results in an X value of 0° and a Y value of −90°. Other changes in attitude of laptop 300 will result in other combinations of X and Y values according to the present invention.

The present invention can adjust visual components on a display device so that the components are level regardless of the position of the display device. In this manner, one can change the display from a "landscape" mode to a "portrait" mode by simply rotating the display 90° either way around one axis. Additionally, the present invention can be employed to adjust the content of the windows such that the content is level regardless of the attitude of the display device at any rotation granularity.

Figure 5A:
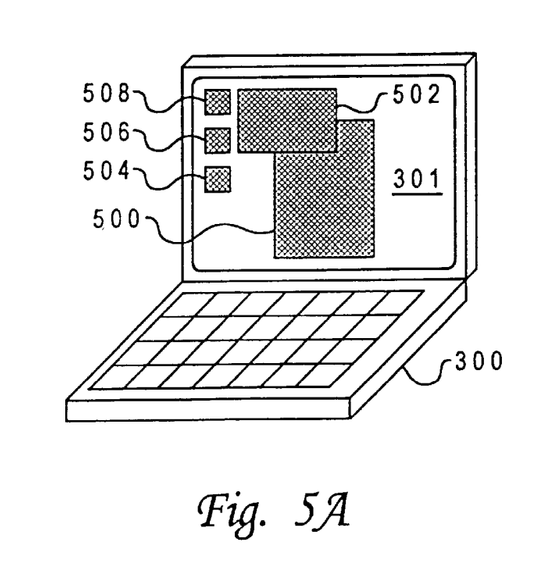
FIGS. 5A–5C are diagrams of different displays according to the present invention.
Figure 5B:
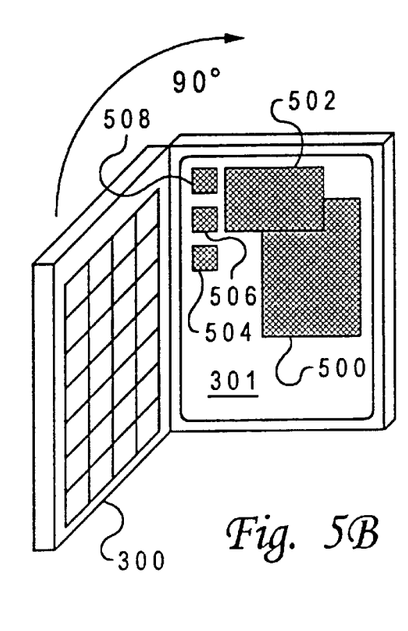
Figure 5C:
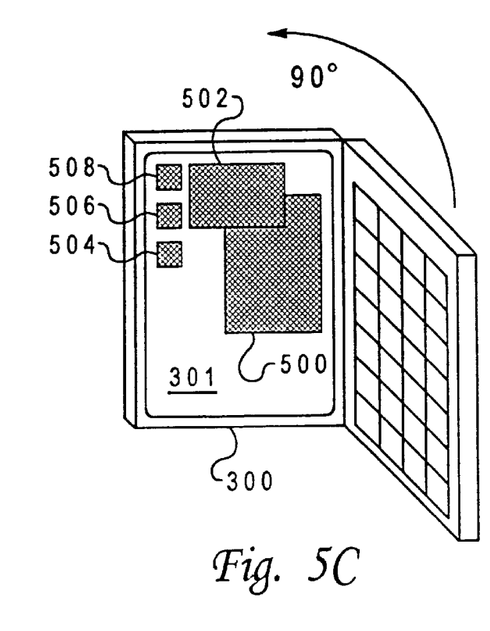

Turning now to FIGS. 5A–5C, diagrams of different displays are illustrated according to the present invention. With reference to FIG. 5A, laptop computer 300 contains windows 500 and 502 and icons 504–508. In FIG. 5B, laptop 300 has been rotated 90° and display 301 is now in a portrait mode. Laptop 300 has been rotated 90° in the other direction from the attitude in FIG. 5A also resulting in display 301 presenting windows 500 and 502 and icons 504–508 in a portrait mode.

Figure 6A:
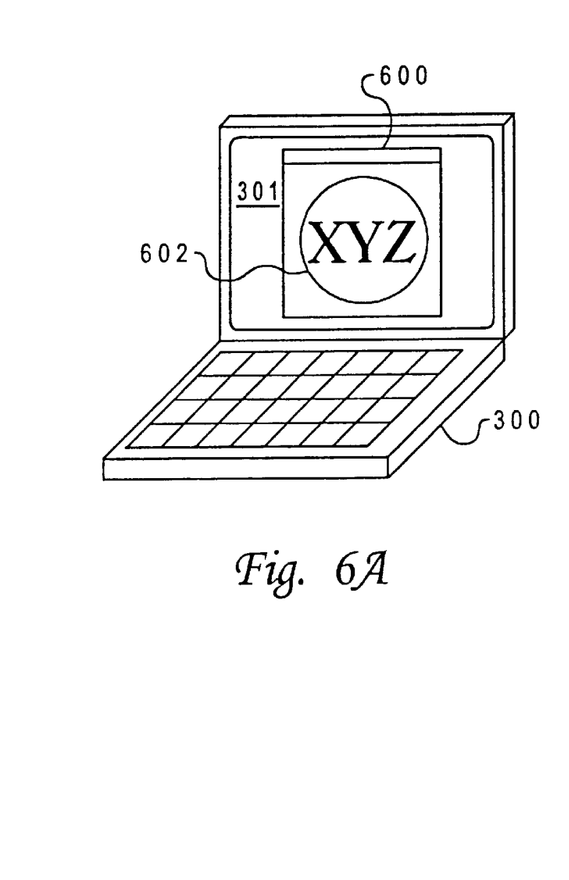
FIGS. 6A–6C depict illustrations of a process for maintaining window objects level through changes in attitude according to the present invention.
Figure 6B:
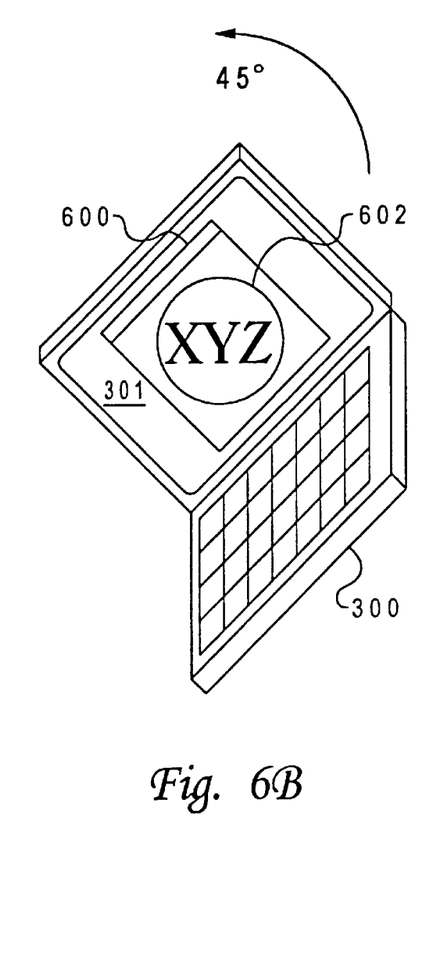
Figure 6C:
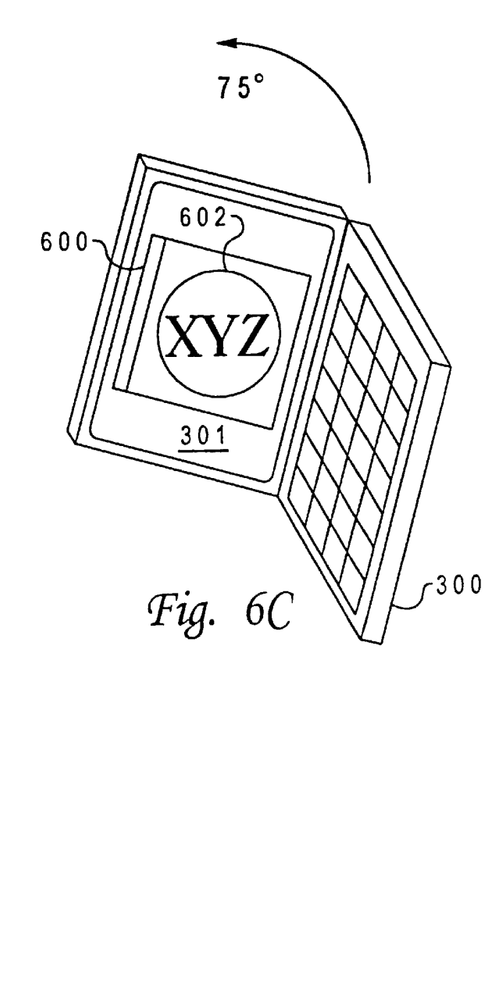

Turning now to FIGS. 6A–6C, illustrations of a process for maintaining window objects level through changes in attitude is depicted according to the present invention. In FIG. 6A, laptop 300 has a "level" attitude within display 301 window 600 contains object 602, which includes the letters "X", "Y", and "Z" in a level attitude with respect to laptop computer 300's initial attitude. In FIG. 6B, laptop computer 300 has been rotated 45°. As can be seen in FIG. 6B, object 602 in window 600 remains level even though laptop computer 300 has been rotated 45°. With a further rotation to 75° from the attitude in FIG. 6A, laptop computer 300 in FIG. 6C shows object 602 remaining level although display 301 and window 600 have changed orientation. This process may be applied to other objects, such as window 600 or icons.

Figure 7:
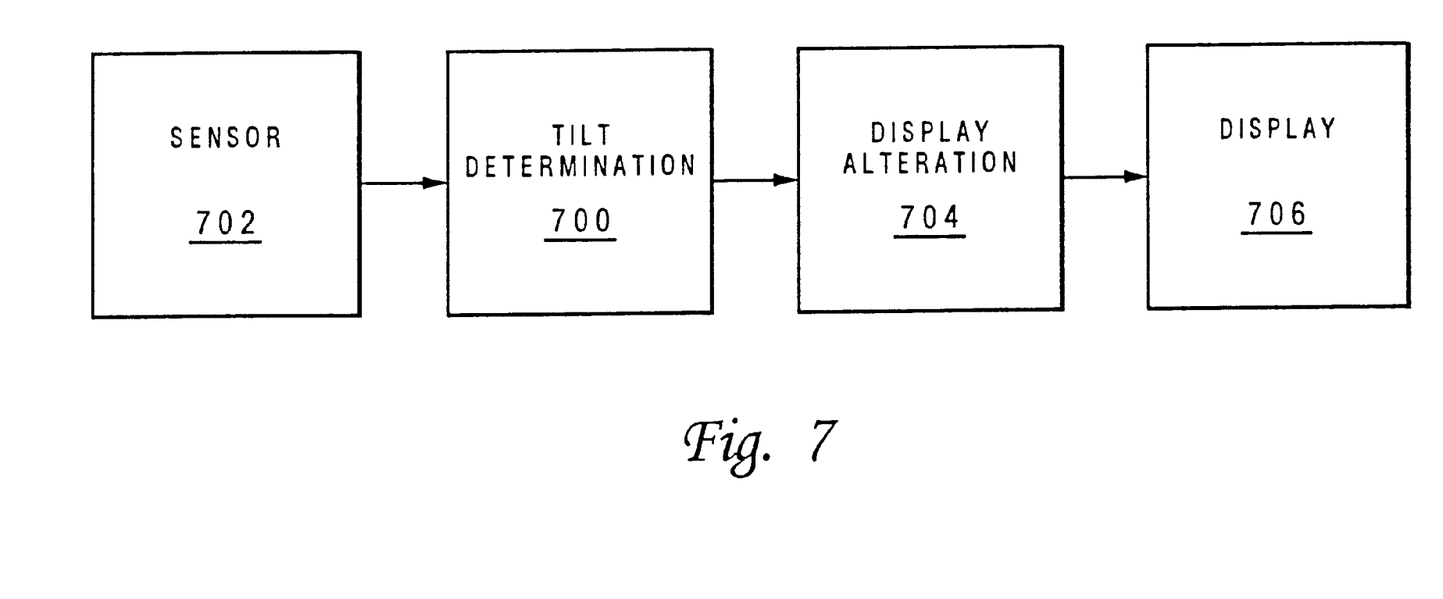
FIG. 7 is a block diagram of components used to alter the display of a data processing system in response to a change in attitude according to the present invention.

Turning now to FIG. 7, a block diagram of components used to alter the display in a data processing system in response to a change in attitude is depicted according to the present invention. Tilt determination block 700 receives an input from sensor block 702. The input is in the form of data indicating the change in attitude of the hardware of interest. Specifically, the input may be in the form of various types of data, such as, for example, changes in X and/or Y axes and the direction of the change in attitude. Display alteration block 704 functions to determine the alteration to the display that is to occur in response to the change in attitude detected by sensor block 702. Display block 706 drives the display of the data on a display device within the data processing system. Display 706 is for example, a standard display driver with display alteration block 704 providing the needed changes to the data being displayed in response to changes in attitude determined by tilt determination block 700.

Sensor 702 is attached to the hardware of interest, such as the host computer or a peripheral (e.g., a display device or a mouse). Sensor 702 provides numeric values to a register. These values may represent data such as the tilt of the hardware relative to a reference plane. The register is available to the operating system or application executing on the data processing system. A low level routine, such as tilt determination block 700, samples the values of the sensor by reading the register. Components, such as display alteration block 704, designed to react to the tilt or change in attitude of the hardware can query the software routine for data. In the depicted example, the values output by the sensor are in degree increments. These degree increments range from −179 to +179 in the X axis and −179 to +179 in the Y axis. The value of X=0 and Y=0 correspond to a level sensor in the depicted example.

Figure 8:
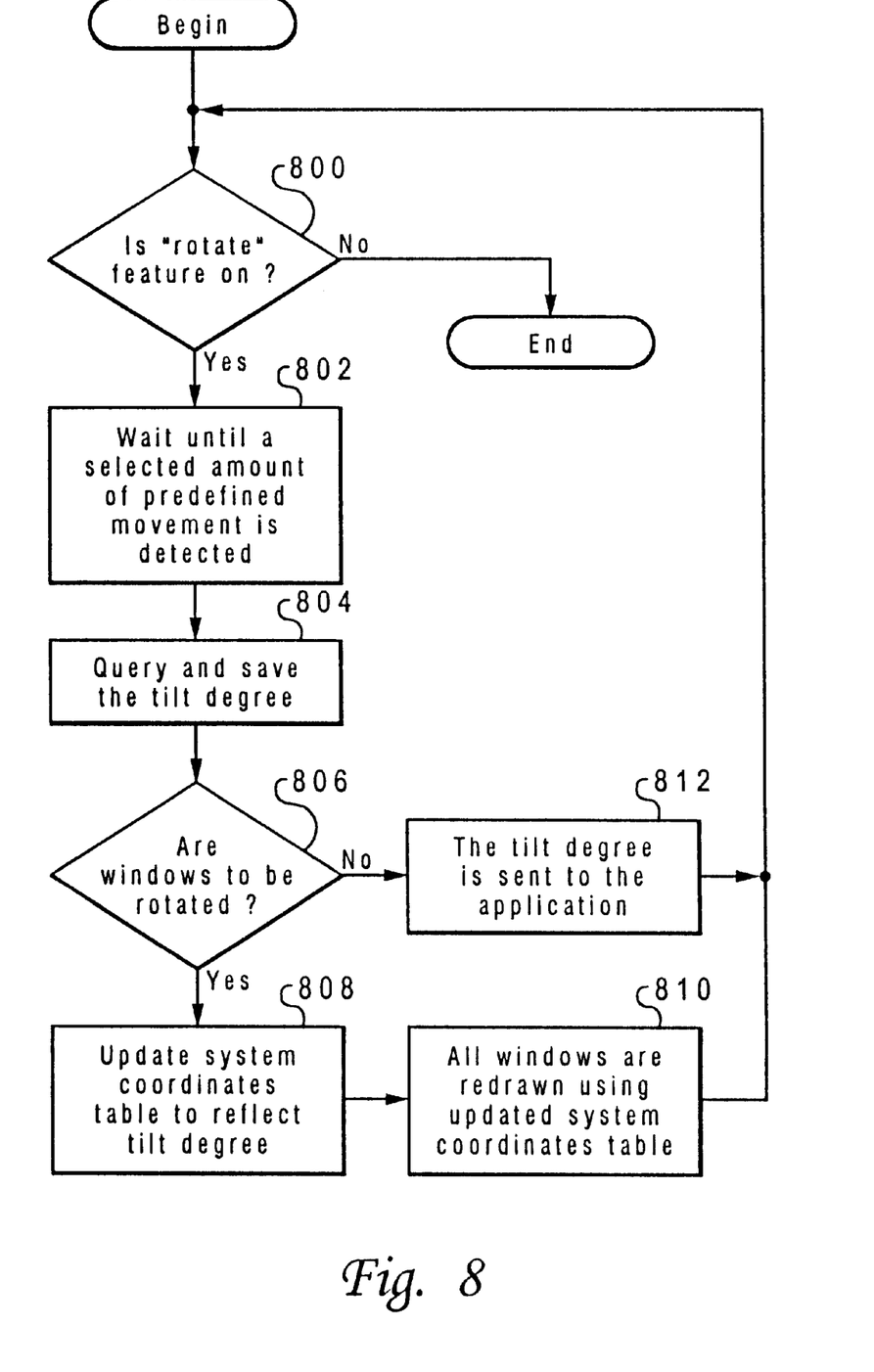
FIG. 8 depicts a flowchart of a process for rotating windows according to the present invention.

With reference now to FIG. 8, a flowchart of a process for rotating windows is depicted according to the present invention. As the device is rotated clockwise or counterclockwise, the present invention maintains the windows level with respect to a preselected reference plane. Alternatively, the contents within the windows may be maintained level relative to the plane in response to rotation of the data processing system. The process begins by determining whether the "rotate" feature has been turned on (step 800). If the rotate feature is on, the process then waits until a selected amount of predefined movement is detected (step 802). Next, a query is made to determine the amount of tilt or change in attitude with this data being saved (step 804). A determination is then made as to whether the windows are to be rotated (step 806). If the windows are to be rotated, the system coordinate table is updated with the results (step 808). System coordinate tables are normally used by most operating systems to define where pixel locations are on the physical screen. Thereafter, the windows are redrawn in response to the update of the system coordinates table (step 810) with the process returning to step 800 thereafter.

With reference again to step 806, if the windows are not to be rotated, the tilt degree is sent to the applications (step 812) with the process then returning to step 800. With reference to step 800, if the rotated feature is off, the process then terminates.

Figure 9:
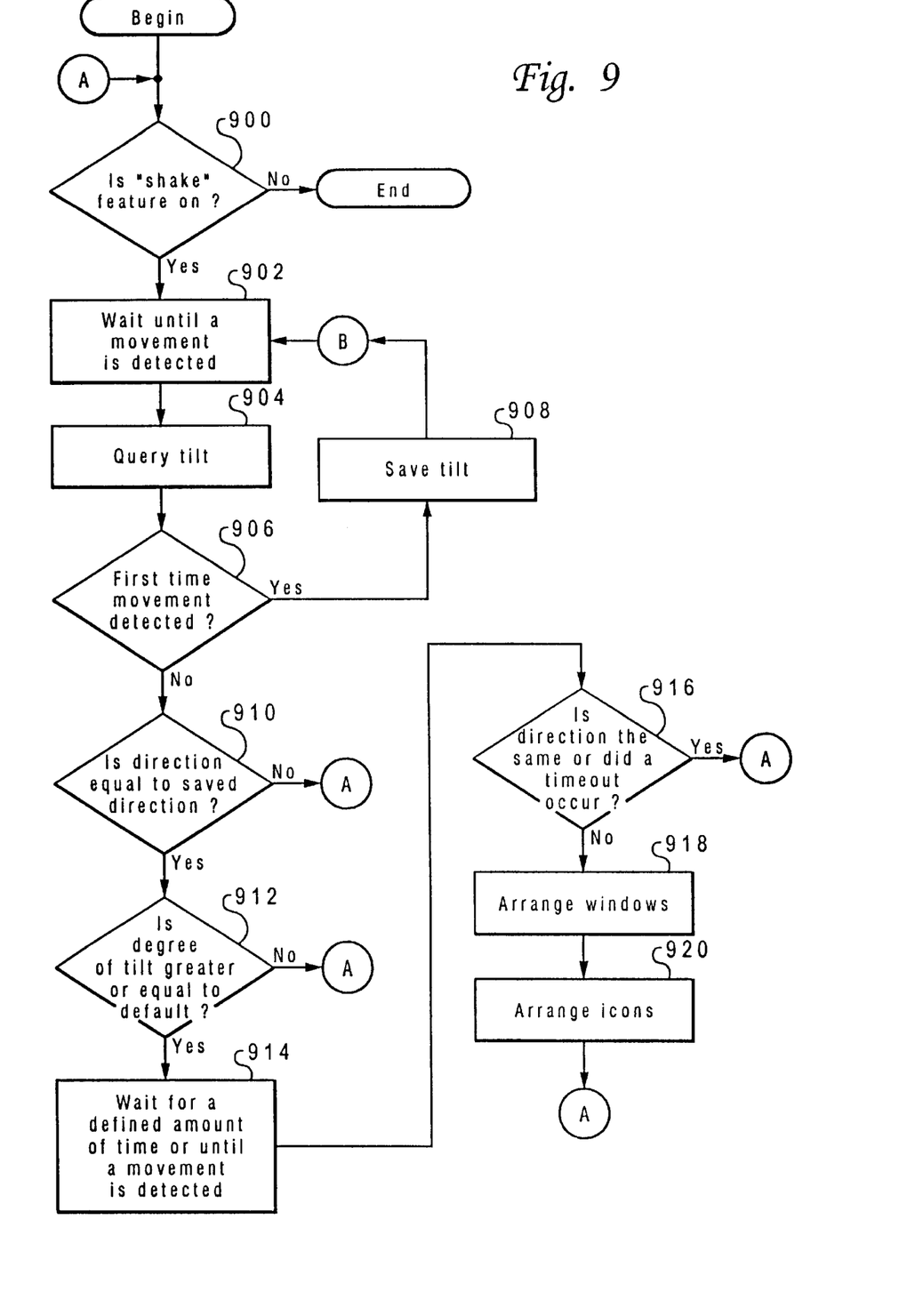
FIG. 9 is a flowchart of a process to open windows and arrange icons according to the present invention.

With reference now to FIG. 9, a flowchart of a process to open windows and arrange icons is depicted according to the present invention. Under the shake feature, tilting the device to the left and to the right in rapid secession twice within a period of time results in the windows and icons being automatically arranged according to the present invention. The process begins by determining whether the "shake" feature for opening windows and arranging icons has been enabled (step 900). "Shake" means to shake the object containing the sensor to the left and right relative to the user. Thereafter, the process waits until movement is detected (step 902). Upon detecting movement, the amount of tilt detected by the sensor is obtained (step 904). Thereafter, the process determines whether this is the first time movement is detected (step 906). If this is the first time movement has been detected, the process saves the tilt (step 908) and then returns to step 902. Otherwise, a determination is made as to whether the direction is equal to the saved direction (step 910). If the direction is equal to the saved direction, a determination is then made as to whether the tilt is greater than or equal to a default amount of tilt (step 912). The default tilt in the depicted example is 20°. This default tilt may be changed by the user or preset at some other amount in accordance with a preferred embodiment of the present invention. If the answer to this query is yes, the process then waits for a defined amount of time or until movement is detected (step 914). Upon reaching the defined amount of time or a detection of movement, the process then determines whether the movement is in the same direction or if a timeout has occurred (step 916). A timeout occurs if no movement occurs within the defined amount of time. If a timeout has occurred, the process returns to step 900. The process also returns to step 900 if the movement is in the same direction.

Otherwise, the process then arranges the windows (step 918). For example, the windows could be arranged in a tile or cascading fashion. Next, the icons are arranged (step 920). The icons can be arranged in any preselected manner the user or programmer desires. Thereafter, the process returns to step 900.

Figure 10:
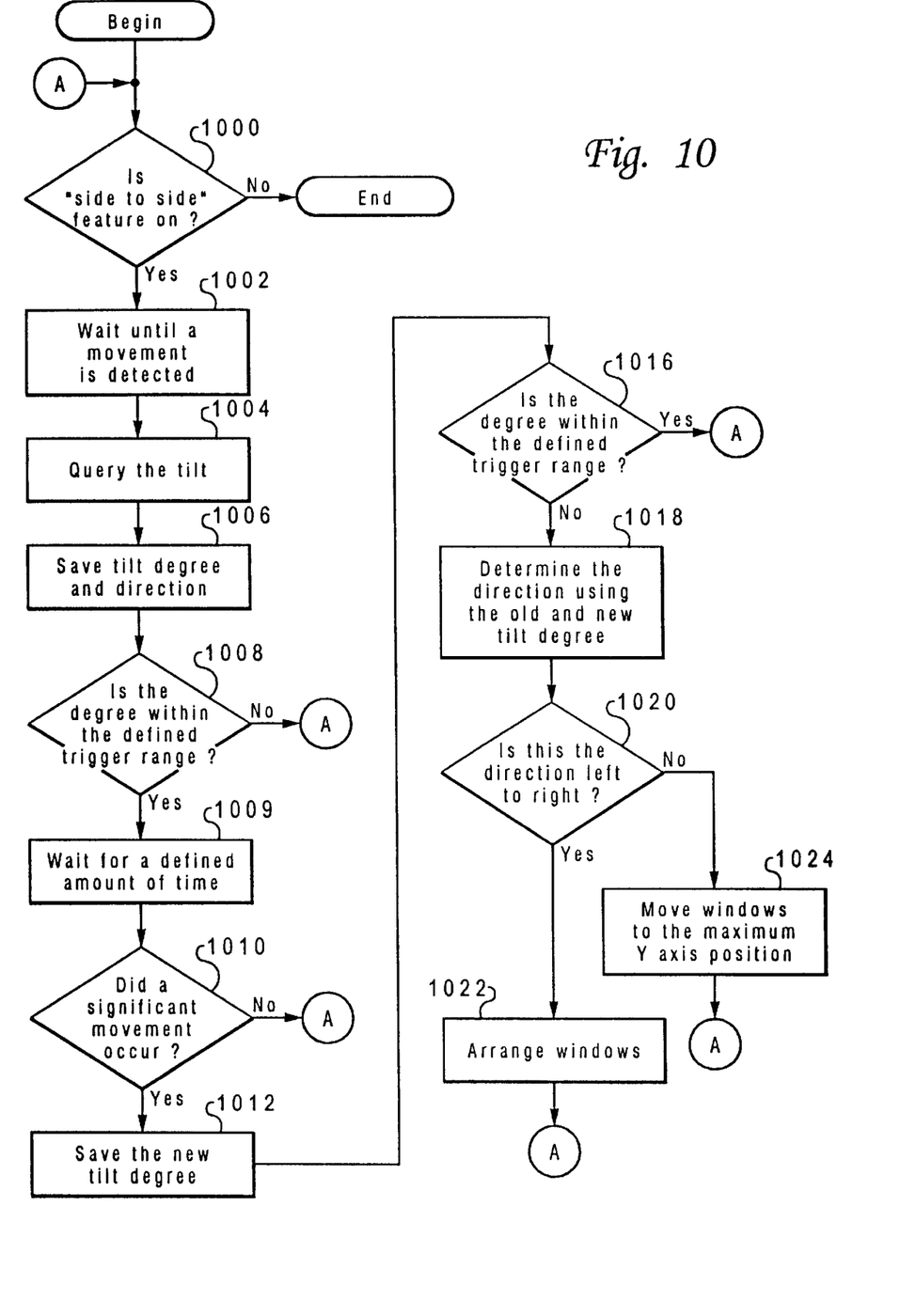
FIG. 10 depicts a flowchart of a process for aligning windows according to the present invention.

With reference now to FIG. 10, a flowchart of a process for aligning windows is depicted according to the present invention. Under this process, tilting the device to one side and holding it at that attitude for a short amount of time results in the windows aligning to the side that is held lower relative to the reference plane. The process begins by determining whether the "side to side" feature for aligning objects is enabled (step 1000). If the feature is enabled, the process waits until a movement of the device is detected (step 1002). The process then queries the tilt to determine the amount of tilt that has occurred (step 1004). The tilt in degrees and direction is then saved (step 1006). A determination is then made as to whether the tilt is within a predefined trigger range (step 1008). The trigger range is a range of degrees defining how much one side must be lifted or tilted. This trigger range may vary depending on the user or data processing system. If the degree of tilt is within the predefined trigger range, the process then waits for a defined amount of time (step 1009). Thereafter, a determination is made as to whether a significant movement has occurred (step 1010). In the depicted example, a significant amount of movement is 45° to 90° starting from 0° (the device laying flat). If a significant amount of movement has occurred, the new tilt is stored (step 1012). A determination is then made as to whether the tilt is within the defined trigger range (step 1016). If the answer to this determination is yes, the process then determines the direction using the old and new tilt (step 1018).

Next, a determination is made as to whether the direction is to the left or to the right relative to the device and the user (step 1020). If the direction is to the left, the windows are moved to the minimum Y axis position (step 1022) with the process then returning to step 1000. If the direction is to the right, the process then moves the windows to the maximum Y axis position (step 1024) with the process then returning to step 1000. With reference again to step 1016, if the degree of tilt is not within the predefined trigger range, the process also returns to step 1000. Additionally, the process returns to step 1000 from step 1012 if a significant amount of movement has not occurred, the process returns to step 1000 from step 1008 if the degree of tilt is not within the predefined trigger range. If the feature in step 1000 is not enabled, the process then terminates. In accordance with a preferred embodiment of the present invention, audio feedback in the form of a beep or some other sound may be provided when the tilt is within the predefined trigger range.

The process in FIG. 10 also may be applied to other objects other than windows. For example, the alignment process may be employed for icons and other objects displayed within a data processing system.

It is important to note that while the present invention has been described in the context of a data processing system, those skilled in the art will appreciated that the mechanisms of the present invention are capable of being distributed in the form of a computer readable medium of instructions in a variety of forms, and that the present invention applies equally regardless of the particular type of signal bearing media used to actually carry out the distribution of the instruction. Examples of computer readable media include: recordable type media such as floppy disks and CD-ROMs and transmission type media such as digital and analog communication links.

Thus, the present invention provides an ideal mechanism for altering the display in data processing systems such as laptop computers and hand-held computers because the present invention provides for an easy mechanism to quickly change spacial attitude. Additionally, a sensor may be installed in a remote device, such as a mouse, for large desktop computers.

While the invention has been particularly shown and described with reference to a preferred embodiment, it will be understood by those skilled in the art that various changes in form and detail may be made therein without departing from the spirit and scope of invention.

What is claimed is:

1. A method for altering a display of objects on a display device comprising:

detecting changes in an attitude of a sensor relative to a plane;

determining a magnitude of the change in the attitude of the sensor during a selected amount of time; and in response to detecting at least one change in the attitude of a threshold amount within the selected amount of time, altering the display of objects on the display device.

2. The method of claim 1, wherein the at least one change in the attitude of a threshold amount within the selected amount of time is a shaking of the display device, wherein the display of objects are windows and icons, and wherein the step of altering the display of objects on the display device further comprises:

rearranging the windows and icons.

3. The method of claim 1, wherein the at least one change in the attitude of a threshold amount within the selected amount of time is a shaking of the display device, wherein the display of objects are windows, and wherein the step of altering the display of objects on the display device further comprises:

arranging icons within the display.

4. The method of claim 2, wherein the step of arranging windows comprises arranging the windows in a tile fashion.

5. The method of claim 2, wherein the step of arranging windows comprises arranging the windows in a cascading fashion.

6. The method of claim 1, wherein the at least one change in the attitude of a threshold amount within the selected amount of time is a lowering of one side of the display below a selected plane for the selected amount of time and wherein the step of altering comprises aligning the windows along the side below the selected plane.

7. A data processing system for altering a display of objects on a display device, comprising:

means for detecting changes in an attitude of a sensor relative to a plane;

determination means for determining a magnitude of the change in the attitude of the sensor during a selected amount of time; and altering means, responsive to detecting at least one change in the attitude of a threshold amount within the selected amount of time, for altering the display of objects on the display device.

8. The data processing system of claim 7, wherein the at least one change in the attitude of a threshold amount within the selected amount of time is a shaking of the display device, wherein the display of objects are windows and icons, and wherein the altering means comprises means for rearranging the windows and icons.

9. The data processing system of claim 7, wherein the at least one change in the attitude of a threshold amount within the selected amount of time is a shaking of the display device, wherein the display of objects are windows, and wherein the altering means comprises means for arranging icons within the display.

10. The data processing system of claim 8, wherein the means for rearranging windows and icons comprises means for arranging the windows in a tile fashion.

11. The data processing system of claim 8, wherein the means for rearranging windows and icons comprises means for arranging the windows in a cascading fashion.

12. The data processing system of claim 7, wherein the at least one change in the attitude of a threshold amount within the selected amount of time is a lowering of one side of the display below a selected plane for the selected amount of time and wherein the altering means comprises means for aligning the windows along the side below the selected plane.

13. A computer readable medium including instructions for use in a data processing system comprising:

instructions for detecting changes in an attitude of a sensor relative to a plane;

instructions for determining a magnitude of the change in the attitude of the sensor during a selected amount of time; and instructions, responsive to detecting at least one change in the attitude of a threshold amount within the selected amount of time, for altering the display of objects on the display device.

14. The computer readable medium of claim 13, wherein the computer readable medium is a random access memory.

15. The computer readable medium of claim 13, wherein the computer readable medium is a CD-ROM.

* * * * *